(12) United States Patent
Ishii et al.

(10) Patent No.: US 7,123,251 B2
(45) Date of Patent: Oct. 17, 2006

(54) IMAGE DISPLAY DEVICE

(75) Inventors: Masahiro Ishii, Mobara (JP); Yoshiaki Nakayoshi, Ooamishirasato (JP); Masaaki Matsuda, Mobara (JP); Kazuhiko Yanagawa, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 345 days.

(21) Appl. No.: 10/435,473

(22) Filed: May 12, 2003

(65) Prior Publication Data
US 2003/0214500 A1 Nov. 20, 2003

(30) Foreign Application Priority Data
May 15, 2002 (JP) .............................. 2002-139730

(51) Int. Cl.
*G09G 5/00* (2006.01)

(52) U.S. Cl. ........................ 345/211; 345/98; 349/139

(58) Field of Classification Search ................ 345/211, 345/98, 87, 90, 99, 100; 349/139, 140, 147, 349/143, 39; 257/59; 259/E29.117
See application file for complete search history.

(56) References Cited

U.S. PATENT DOCUMENTS 5,751,381 A * 5/1998 Ono et al. .................... 399/46
5,936,598 A * 8/1999 Hayama et al. ............... 345/76
6,184,947 B1 * 2/2001 Ozaki et al. ................... 349/42
6,794,743 B1 * 9/2004 Lamson et al. ............. 257/691

* cited by examiner

Primary Examiner—Richard Hjerpe
Assistant Examiner—Abbas Abdulselam
(74) Attorney, Agent, or Firm—Reed Smith LLP; Stanley P. Fisher, Esq.; Juan Carlos A. Marquez, Esq.

(57) ABSTRACT

The present invention aims at acquiring a display device with no brightness irregularities of display. A plurality of drain signal lines are formed in parallel on a pixel-forming-side surface of a substrate. With respect to the respective drain signal lines, a plurality of drain signal lines which are arranged close to each other are formed into each group, and one ends of the respective drain signal lines which are formed into each group are converged together, are extended and are connected to an output terminal of a semiconductor integrated circuit which constitutes a video signal drive circuit. A bus line for supplying reference signals to respective pixels is formed on at least an outer profile side of a mass of pixels at the video signal drive circuit side. The first power supply lines start from both sides of the semiconductor integrated circuit, run outside the drain signal lines which are formed into groups and are connected to the bus line. Second power supply lines start from both sides of the semiconductor integrated circuit, reach portions of the bus line corresponding to an approximately center portion of the drain signal lines which are formed into groups and are connected to the bus line.

14 Claims, 14 Drawing Sheets

IMAGE DISPLAY DEVICE

BACKGROUND OF THE INVENTION

The present invention relates to an image display device, and more specifically to an image display device such as a liquid crystal display device or the like.

A liquid crystal display device is, as shown in FIG. 16, configured such that on a pixel-forming-side surface of a substrate, a plurality of gate signal lines GL which are arranged in parallel and a plurality of drain signal lines DL which cross the respective gate signal lines GL and are arranged in parallel are formed, and pixels are formed on respective regions surrounded by these respective signal lines.

Although not shown in FIG. 16, each pixel includes a switching element (for example, a thin film transistor) which is operated in response to a scanning signal from the gate signal line GL and a pixel electrode to which a video signal is supplied from the drain signal line DL through the switching element.

Further, the scanning signals which are supplied to respective gate signal lines GL are generated by a scanning signal drive circuit V which is formed outside a liquid crystal display part AR which is a mass of pixels, wherein when a plurality of gate signal lines GL which are arranged close to each other are formed into one group, the scanning signal drive circuit is constituted of a plurality of semiconductor integrated circuits which are allocated to respective groups.

In the same manner, the video signals which are supplied to respective drain signal lines DL are generated by a video signal drive circuit which is also formed outside the liquid crystal display part AR, wherein when a plurality of drain signal lines DL which are arranged close to each other are formed into one group, the video signal drive circuit He is constituted of a plurality of semiconductor integrated circuit which are allocated to respective groups.

Further, there may be a case in which, besides the scanning signals and the video signals, a signal which becomes the reference with respect to these signals is supplied to the each pixel. For example, as such a reference signal, a signal to be supplied to counter electrodes for generating an electric field to drive liquid crystal between the counter electrodes and the pixel electrodes, a signal to be supplied to capacitive signal lines for forming capacitance between the pixel electrode and the capacitive signal lines or the like is considered.

In this case, the reference signal is supplied to each pixel through power supply lines SL which start from both sides of the each semiconductor device, run outside a grouped signal lines and are connected to a bus line BL which is formed such that the bus line BL draws a profile of the liquid crystal display part AR.

Here, the bus line BL is connected to the counter electrodes or the capacitive signal lines through reference potential lines SVL which are formed such that the reference potential lines SVL reach the respective pixels.

BRIEF SUMMARY OF THE INVENTION

However, the inventors have found that, in the liquid crystal display device having such a constitution, assuming signal lines which are formed into a group as a unit, there arises a case in which brightness irregularities of display occur between a center portion and both side portions of the unit.

As a result of an extensive study of such a phenomenon, it has been found out that since the reference signal is supplied to the bus line BL from the power supply lines SL which start from both sides of each semiconductor device and run outside the respective signal lines formed into groups, among respective signal lines which are formed into the group, the power supply resistance differs between the center portion and the both side portions.

The present invention has been made in view of the above circumstances and it is an object of the present invention to provide an image display device which can eliminate brightness irregularities.

To briefly explain typical inventions among inventions disclosed in the specification, they are as follows.

Means 1.

In the image display device according to the present invention, for example, a plurality of drain signal lines are formed in parallel on a pixel-forming-side surface of a substrate, with respect to the respective drain signal lines, a plurality of drain signal lines which are arranged close to each other are formed into each group, and one ends of the respective drain signal lines which are formed into each group are converged together, are extended and are connected to an output terminal of a semiconductor integrated circuit which constitutes a video signal drive circuit, a bus line for supplying reference signals to respective pixels is formed at least on an outer profile of a mass of the pixels at a video signal drive circuit side, first power supply lines are formed such that the first power supply lines start from both sides of the semiconductor integrated circuit, run outside the drain signal lines which are formed into groups and are connected to the bus line, and second power supply lines are formed such that the second power supply lines start from both sides of the semiconductor integrated circuit, reach portions of the bus line corresponding to an approximately center portion of the drain signal lines which are formed into groups and are connected to the bus line.

Means 2.

In the image display device according to the present invention, for example, a plurality of drain signal lines are formed in parallel on a pixel-forming-side surface of a substrate, with respect to the respective drain signal lines, a plurality of drain signal lines which are arranged close to each other are formed into each group, and one ends of the respective drain signal lines which are formed into each group are converged together, are extended and are connected to an output terminal of a semiconductor integrated circuit which constitutes a video signal drive circuit, a bus line for supplying reference signals to respective pixels is formed at least on an outer profile of a mass of the pixels at a video signal drive circuit side, first power supply lines are formed such that the first power supply lines start from both sides of the semiconductor integrated circuit, run outside the drain signal lines which are formed into groups and are connected to the bus line, second power supply lines are formed such that the second power supply lines start from both sides of the semiconductor integrated circuit, reach portions of the bus line corresponding to an approximately center portion of the drain signal lines which are formed into groups and are connected to the bus line, and third power supply lines are formed such that the third power supply lines start from both sides of the semiconductor integrated circuit and are connected to the bus line between connection portions of the first power supply lines with the bus line and connection portions of the second power supply lines with the bus line.

Means 3.

The image display device according to the present invention is, for example, on the premise of the constitution of either the means 1 or the means 2, characterized in that the second power supply lines are formed of a layer different from the drain signal lines by way of an insulation film.

Means 4.

The image display device according to the present invention is, for example, on the premise of the constitution of either the means 1 or the means 2, characterized in that the number of the drain signal lines which are formed into each group is an even number.

Means 5.

In the image display device according to the present invention, for example, a plurality of gate signal lines are formed in parallel on a pixel-forming-side surface of a substrate, with respect to the respective gate signal lines, a plurality of gate signal lines which are arranged close to each other are formed into each group, and one ends of the respective gate signal lines which are formed into each group are converged together, are extended and are connected to an output terminal of a semiconductor integrated circuit which constitutes a scanning signal drive circuit, a bus line for supplying reference signals to respective pixels is formed at least on outer profile of a mass of the pixels at a scanning signal drive circuit side, first power supply lines are formed such that the first power supply lines start from both sides of the semiconductor integrated circuit, run outside the gate signal lines which are formed into groups and are connected to the bus line, and second power supply lines are formed such that the second power supply lines start from both sides of the semiconductor integrated circuit, reach portions of the bus line corresponding to an approximately center portion of the gate signal lines which are formed into groups and are connected to the bus line.

Means 6.

In the image display device according to the present invention, for example, a plurality of gate signal lines are formed in parallel on a pixel-forming-side surface of a substrate, with respect to the respective gate signal lines, a plurality of gate signal lines which are arranged close to each other are formed into each group, and one ends of the respective gate signal lines which are formed into each group are converged together, are extended and are connected to an output terminal of a semiconductor integrated circuit which constitutes a scanning signal drive circuit, a bus line for supplying reference signals to respective pixels is formed at least on an outer profile of a mass of the pixels at a scanning signal drive circuit side, first power supply lines are formed such that the first power supply lines start from both sides of the semiconductor integrated circuit, run outside the gate signal lines which are formed into groups and are connected to the bus line, second power supply line is formed such that the second power supply lines start from both sides of the semiconductor integrated circuit, reach a portion of the bus line corresponding to an approximately center portion of the gate signal lines which are formed into groups and are connected to the bus line, and third power supply lines are formed such that the third power supply lines start from both sides of the semiconductor integrated circuit and are connected to the bus line between connection portions of the first power supply lines with the bus line and connection portions of the second power supply lines with the bus line.

Means 7.

The image display device according to the present invention is, for example, on the premise of the constitution of either the means 5 or the means 6, characterized in that the second power supply lines are formed of a layer different from the gate signal lines by way of an insulation film.

Means 8.

The image display device according to the present invention is, for example, on the premise of the constitution of either the means 5 or the means 6, characterized in that the number of the gate signal lines which are formed into each group is an even number.

Means 9.

In the image display device according to the present invention, for example, a plurality of signal lines are formed in parallel on a pixel-forming-side surface of a substrate, with respect to the respective signal lines, a plurality of signal lines which are arranged close to each other are formed into each group, and one ends of the respective signal lines which are formed into each group are converged together, are extended and are connected to an output terminal of a semiconductor integrated circuit which constitutes a signal drive circuit and is mounted on the substrate, a bus line for supplying reference signals to respective pixels is formed on at least an outer profile of a mass of the pixels at the signal-drive-circuit side, and the reference signals are supplied to the bus line through a power supply line formed on a mounting region of the semiconductor integrated circuit.

Means 10.

The image display device according to the present invention is, for example, on the premise of the constitution of means 9, characterized in that the power supply line is constituted of a plurality of power supply lines.

Means 11.

In the image display device according to the present invention, for example, a plurality of signal lines are formed in parallel on a pixel-forming-side surface of a substrate, with respect to the respective signal lines, a plurality of signal lines which are arranged close to each other are formed into each group, and one ends of the respective signal lines which are formed into each group are converged together, are extended and are connected to an output terminal of a semiconductor integrated circuit which constitutes a signal drive circuit, the semiconductor integrated circuit is configured to include a resin substrate, a semiconductor chip mounted on the resin substrate and a wiring layer for pulling out terminals of the semiconductor chip to a surface of the resin substrate, a bus line for supplying reference signals to respective pixels is formed on at least an outer profile of a mass of the pixels at the signal drive circuit side, and the reference signals are supplied to the bus line through a power supply line formed on a surface of the resin substrate of the semiconductor integrated circuit.

Means 12.

The image display device according to the present invention is, for example, on the premise of the constitution of means 11, characterized in that the power supply line is formed on a surface of the resin substrate of the semiconductor integrated circuit opposite to the surface on which the wiring layer is formed.

Here, the present invention is not limited to the above-mentioned constitutions and various modifications can be made without departing from the technical concept of the present invention. For example, in the above-mentioned means, the second power supply lines are formed such that the second power supply lines start from both sides of the semiconductor integrated circuit, reach the portion of the bus line corresponding to an approximately center portion of the drain signal lines which are formed into groups and are connected to the bus line. However, the second power supply lines may be configured such that the second power supply lines are connected from the semiconductor integrated circuit to the bus line in a state that each of second power supply lines is arranged between two first power supply lines. In this case, it is desirable that the second power supply lines are connected to the vicinity of the center of the bus line to which two first power supply lines are connected in view of suppression of the brightness irregularities of display at the center and both side portions.

DETAILED DESCRIPTION OF THE INVENTION

Preferred embodiments of an image display device according to the present invention are explained in detail hereinafter in conjunction with drawings.

Embodiment 1.

Figure 1A:
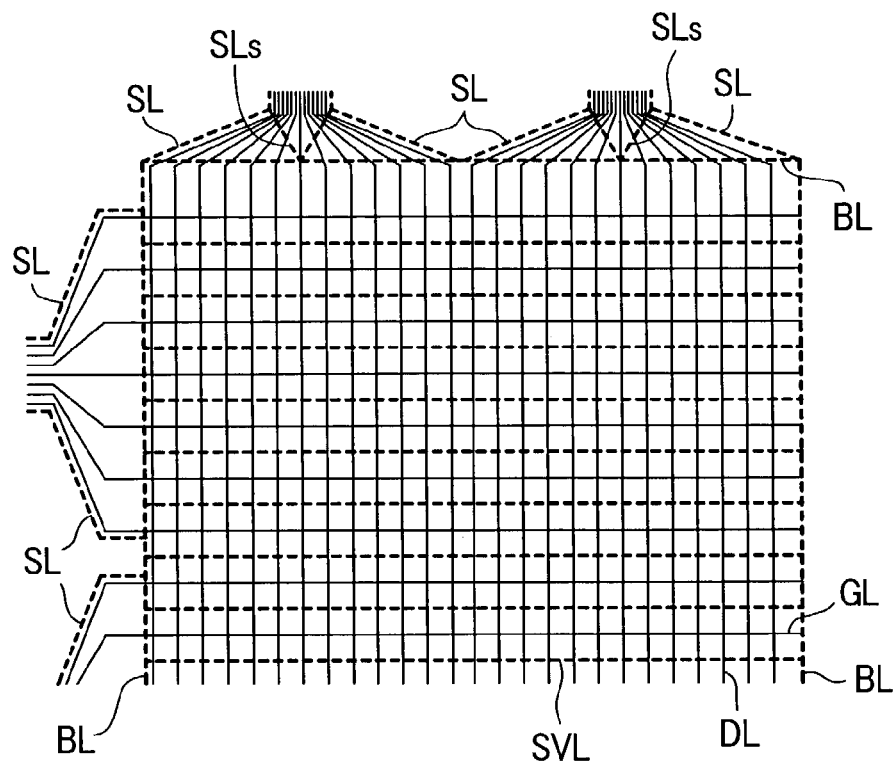
FIG. 1 is a constitutional view showing one embodiment of an image display device according to the present invention.
Figure 16:
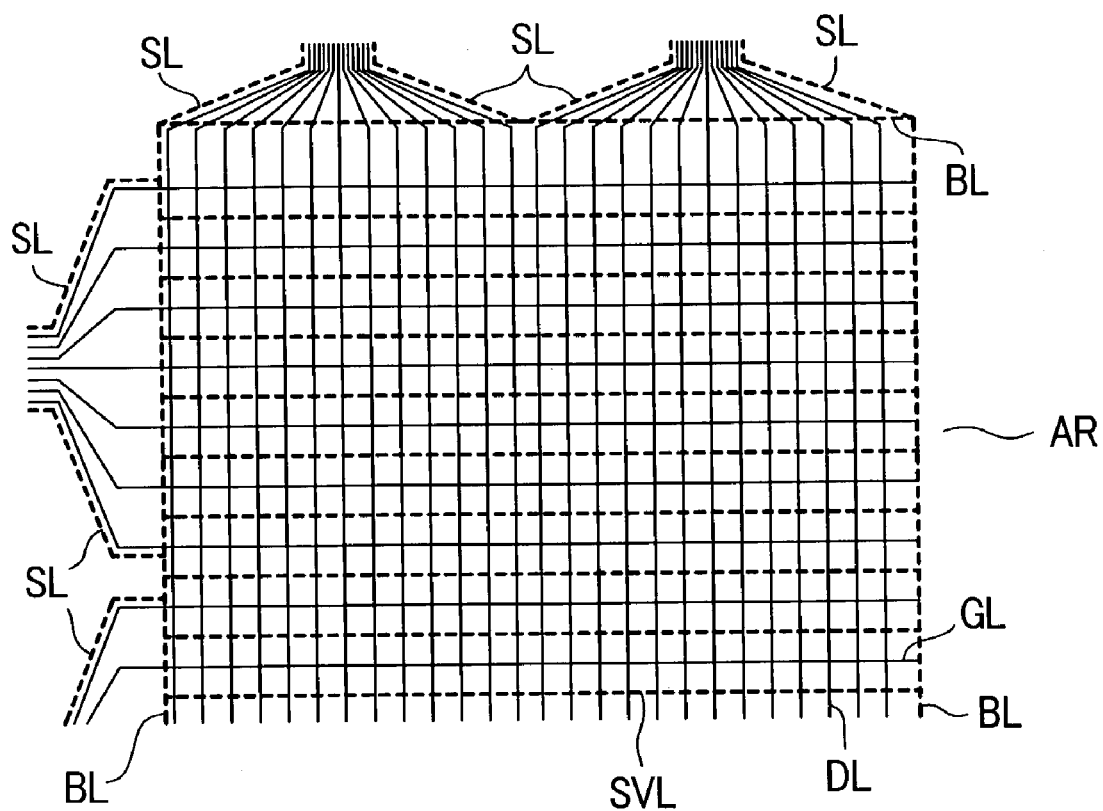
FIG. 16 is a plan view showing one example of a conventional image display device.

FIG. 1A is a schematic constitutional view showing one embodiment of an image display device according to the present invention and corresponds to FIG. 16.

The constitution which makes this embodiment different from the example shown in FIG. 16 lies in that respective power supply lines SL formed at both sides of each semiconductor integrated circuit constituting a video signal drive circuit also have, besides the power supply lines SL which run outside drain signal lines DL formed into a group and are connected to a bus line BL, separate power supply lines SLs which are newly formed and are connected to a portion of the bus line BL corresponding to an approximately center portion of the drain signal lines DL which are formed into a group.

These power supply lines SLs are formed as a layer different from the drain signal lines DL by way of an insulation film such that the power supply lines SLs are insulated from the drain signal lines DL.

As shown in the drawing, the respective drain signal lines DL which are formed into a group are extended in a converging manner to each other in the vicinity of a video signal drive circuit He which is connected to the semiconductor integrated circuit and are connected to output terminals of the semiconductor integrated circuit.

Since a pitch of output terminals of the semiconductor integrated circuit is set smaller than a pitch of the drain signal lines DL, the image display device is configured to have the above-mentioned converging portion.

Accordingly, the power supply lines SL which run outside the drain signal lines DL which are formed into each group are spread in a flared shape from the semiconductor-integrated-circuit side to the bus-line-BL side. Further, the power supply lines SLs which are formed separately in this embodiment are formed such that they are directed toward the approximately center of the drain signal lines DL which are formed into each group and are converged to each other.

Figure 1B:
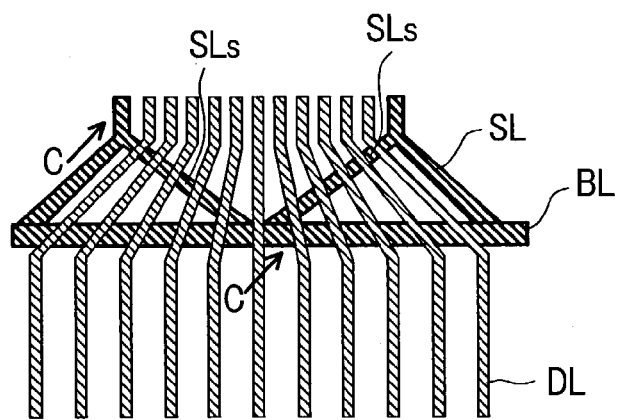

As shown in a cross-sectional view taken along a line c—c in FIG. 1B, the drain signal lines DL are formed as a layer above the insulation film GI. Further, the power supply lines SLs are formed as a layer below the insulation film GI and are integrally formed with other power supply lines SL and the bus line BL.

Due to such a constitution, the bus line BL is connected with power supply lines SL, SLs at a short interval along the longitudinal direction thereof and, furthermore, the interval is set substantially equal and hence, it is possible to supply the reference voltage uniformly without irregularities in potential difference. Accordingly, it is possible to supply the uniform reference voltage having no irregularities from the bus lines BL to the respective pixels.

Figure 17A:
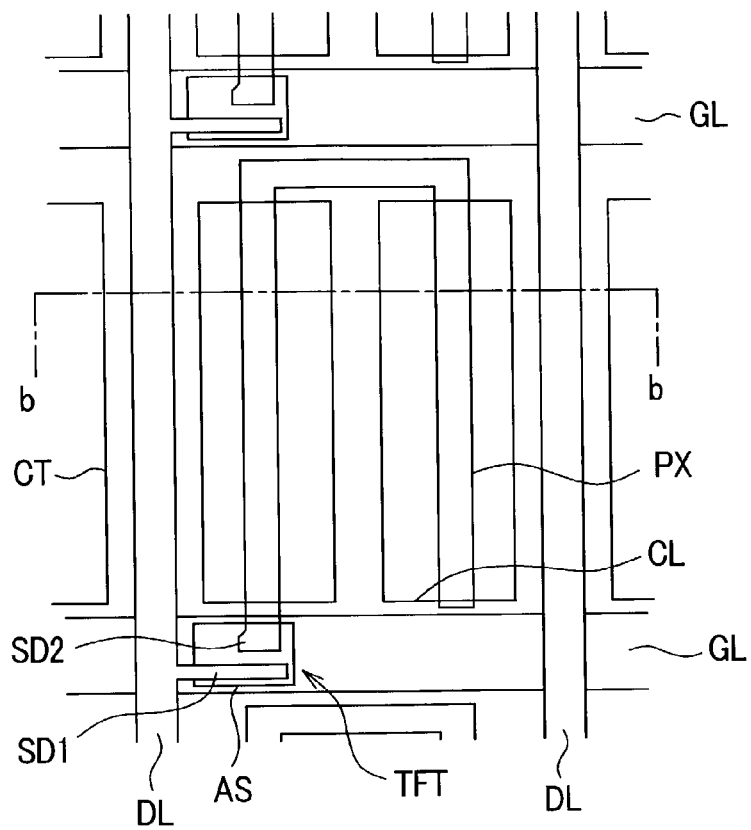
FIG. 17 is a constitutional view showing one embodiment of a pixel of the image display device of the present invention.
Figure 17B:
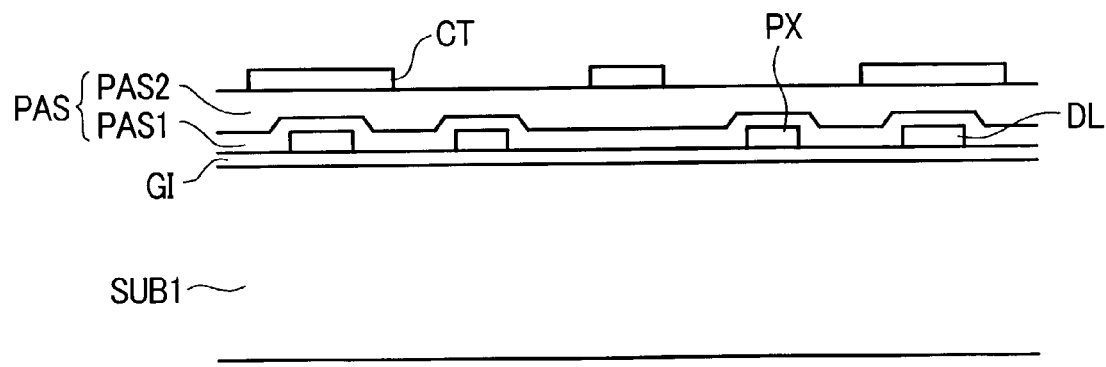

FIG. 17A is a plan view showing one embodiment of the constitution of a pixel region which is surrounded by the gate signal lines GL which are arranged close to each other and the drain signal lines DL which are arranged close to each other. Further, FIG. 17B is a view showing a cross section taken along a line b—b in FIG. 17A.

In these drawings, on a liquid-crystal-side surface of a transparent substrate SUB1, first of all, a pair of gate signal lines GL which extend in the x direction and are arranged in parallel in the y direction are formed.

These gate signal lines GL surround the rectangular region together with a pair of drain signal lines DL which will be explained later and this region constitutes the pixel region.

On the surface of the transparent substrate SUB1 on which the gate signal lines GL are formed in such a manner, an insulation film GI which is made of SiN, for example, is formed such that the insulation film GI also covers the gate signal lines GL.

The insulation film GI performs a function of an interlayer insulation film with respect to the gate signal lines GL in regions where the drain signal lines DL which will be explained later are formed and also performs a function of a gate insulation film on a region where a thin film transistor TFT which will be explained later is formed.

Then, on a surface of the insulation film GI, a semiconductor layer AS made of amorphous Si, for example, is formed such that the semiconductor layer AS is overlapped to a portion of the gate signal line GL.

The semiconductor layer AS is a semiconductor layer of the thin film transistor TFT, wherein by forming a drain electrode SD1 and a source electrode SD2 on an upper surface of the semiconductor layer AS, it is possible to constitute an MIS type transistor having an inverse staggered structure which uses a portion of the gate signal line as a gate electrode.

Here, the drain electrodes SD1 and the source electrodes SD2 are simultaneously formed at the time of forming the drain signal line DL.

That is, the drain signal lines DL which extend in the y direction and are arranged in parallel in the x direction are formed, portions of the drain signal lines DL are extended to upper surfaces of the semiconductor layers AS so as to form the drain electrodes SD1, while the source electrodes SD2 are formed in a spaced-apart manner from the drain electrodes SD1 by a length of channels of the thin film transistors TFT.

Further, the source electrodes SD2 are integrally formed with the pixel electrodes PX which are formed inside the pixel regions.

That is, the pixel electrode PX is constituted of a group of a plurality (two in the drawing) of electrodes which extend in the y direction and are arranged in parallel in the x direction. Out of these pixel electrodes PX, one end portions of one pixel electrode PX also functions as the source electrode SD2 and another end portion of each pixel electrode PX is electrically connected with a corresponding portion of another pixel electrode PX.

On the surface of the transparent substrate SUB1 on which the thin film transistors TFT, the drain signal lines DL, the drain electrodes SD1, the source electrodes SD2 and the pixel electrodes PX are formed, a protective film PAS is formed. This protective film PAS is a film which is served for obviating a direct contact of the thin film transistors TFT and the liquid crystal and can prevent the deterioration of characteristics of the thin film transistors TFT.

Here, the protective film PAS may be formed of an organic material layer made of resin or the like or is formed of a sequential laminated body consisting of an inorganic material layer made of SiN or the like and an organic material layer made of resin or the like. In the case shown in FIG. 17, the protective film PAS is formed of the sequential laminated body consisting of a protective film PAS1 formed of the inorganic material layer and a protective film PAS2 formed of the organic material layer such as resin. The reason that at least the organic material layer is used as the protective film PAS is to reduce the dielectric constant of the protective film per se.

Counter electrodes CT are formed on an upper surface of the protective film PAS. The counter electrodes CT are, in the same manner as the previously-mentioned pixel electrodes PX, constituted of a group of a plurality of (three in the drawing) electrodes which extend in the y direction and a are arranged in parallel in the x direction. Further, these respective electrodes are positioned between the above-mentioned pixel electrodes PX when viewed in plan.

That is, the counter electrodes CT and the pixel electrodes PX are arranged at an equal interval in order of the counter electrode, the pixel electrode, the counter electrode, the pixel electrode, . . . , the counter electrode from one-side drain signal line to another-side drain signal line.

Here, the counter electrodes CT which are positioned at both sides of the pixel region are formed such that portions thereof are overlapped to the drain signal lines DL and, at the same time, are formed in common with corresponding counter electrodes CT of the neighboring pixel region.

That is, the counter electrode CT is overlapped to the drain signal line DL such that their center axes are substantially aligned with each other and a width of the counter electrode CT is set larger than a width of the drain signal line DL. The counter electrode CT arranged at the left side with respect to the drain signal line DL constitutes one of respective counter electrodes CT of the left-side pixel region, while the counter electrode CT arranged at the right side with respect to the drain signal line DL constitutes one of respective counter electrodes CT of the right-side pixel region.

In this manner, by forming the counter electrode CT having a width larger than a width of the drain signal line DL over the drain signal line DL, it is possible to obtain an advantageous effect that lines of electric force from the drain signal line DL is prevented from terminating at the counter electrode CT or terminating at the pixel electrode PX. When the lines of electric force from the drain signal line DL terminate at the pixel electrode PX, this gives rise to noises.

The respective counter electrodes CT which constitute a group of electrodes are integrally formed with counter voltage signal lines CL which are formed such that the counter voltage signal lines CL sufficiently cover the gate signal lines GL and are made of the same material as the counter electrodes CT, wherein the reference voltage is supplied through these counter voltage signal lines CL.

Here, the counter voltage signal lines CL function as the above-mentioned reference potential lines SVL.

Here, the counter electrodes CT and the counter voltage signal lines CL are made of a light transmissive conductive material such as ITO (Indium Tin Oxide), ITZO (Indium Tin Zinc Oxide), IZO (Indium Zinc Oxide), $SNO_2$ (Tin Oxide), $IN_2O_3$ (Indium Oxide) for enhancing the numerical aperture of the pixels.

With respect to the counter voltage signal line CL which is formed such that the counter voltage signal line CL sufficiently covers the gate signal line GL, below portions of the counter voltage signal line CL which are projected from the gate signal line GL, connection portions of respective pixel electrodes PX are positioned. Due to such a constitution, a capacitive element Cstg which uses the protective film PAS as a dielectric film is formed between the pixel electrode PX and the counter voltage signal line CL.

The capacitive element Cstg is configured to have a function of storing video signals supplied to the pixel electrode PX for a relatively long time, for example.

Then, on the upper surface of the transparent substrate SUB1 on which the counter electrodes CT are formed in this manner, an orientation film (not shown in the drawing) is formed such that the orientation film also covers the counter electrode CT. This orientation film is a film which is directly brought into contact with the liquid crystal and the initial orientation direction of molecules of the liquid crystal is determined based on rubbing formed on the surface of the orientation film. Embodiment 2.

Figure 2:
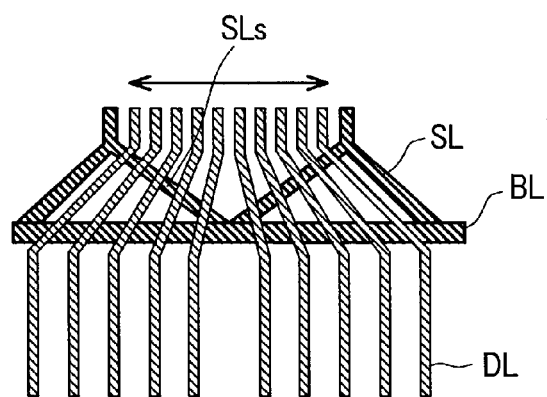
FIG. 2 is a plan view of an essential part showing another embodiment of the image display device of the present invention.

FIG. 2 is a constitutional view showing another embodiment of the image display device according to the present invention and corresponds to FIG. 1B.

The constitution which makes this embodiment different from the embodiment shown in FIG. 1B lies in that the number of drain signal lines DL which are formed into each group is set to an even number.

Due to such a constitution, connection portions of the power supply lines SLs with the bus line BL are arranged between the drain signal lines DL which are arranged close to each other and hence, the number of drain signal lines DL which are overlapped to the power supply line SLs at one side (for example, the right side in the drawing) and the number of drain signal lines DL which are overlapped to the power supply line SLs at another side (for example, left side in the drawing) can be set equal.

This implies that the parasitic capacitance between the one-side power supply line SLs and the drain signal lines DL which are overlapped to the power supply line SLs and the parasitic capacitance between another-side power supply line SLs and the drain signal lines DL which are overlapped to another-side power supply line SLs can be set equal and hence, it is possible to obtain an advantageous effect that the brightness irregularities of display attributed to the parasitic capacitances can be reduced.

Here, as the number of the drain signal lines DL which are formed into each group is selected from 128, 258, 300, 384, 480 or the like, for example.

Embodiment 3.

Figure 3A:
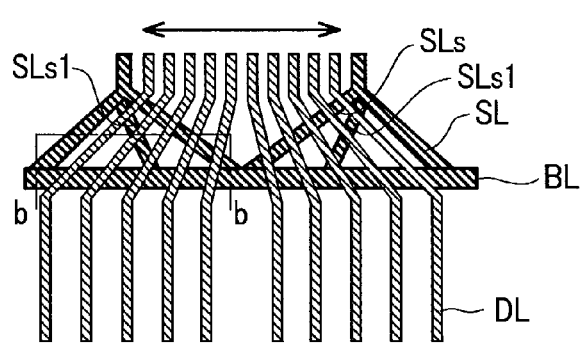
FIG. 3 is a constitutional view of an essential part showing another embodiment of the image display device of the present invention.
Figure 3B:
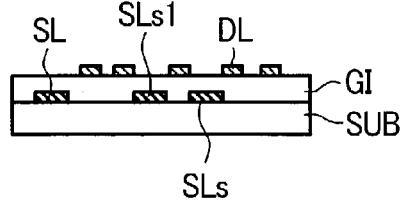

FIG. 3A is a constitutional view showing another embodiment of the image display device according to the present invention and corresponds to FIG. 2. Further, FIG. 3B is a cross-sectional view taken along a line b—b in FIG. 3A.

Figure 1C:
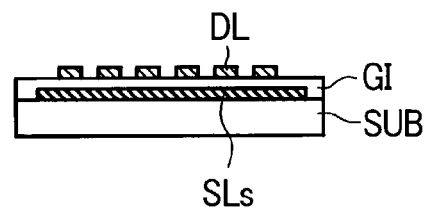

The constitution which makes this embodiment different from the embodiment shown in FIG. 2 lies in that the number of power supply lines SLs is further increased. That is, new power supply lines SLs are formed between both sides of the semiconductor integrated circuit and the bus line BL such that connection portions of the new power supply lines SLs with the bus line BL are disposed between the connection portion of the power supply lines SL with the bus line BL and the connection portions of the power supply lines SLs shown in FIG. 1 with the bus line BL.

Such a constitution is effectively used when the number of drain signal lines DL which are formed into a group is relatively large such as 258, 300, 384, 480.

Embodiment 4.

Figure 4:
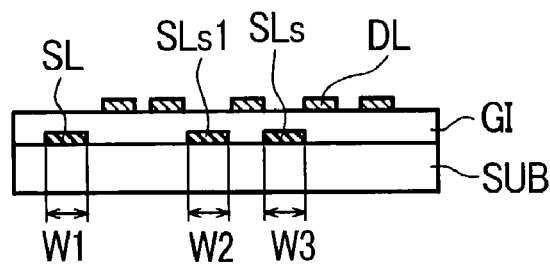
FIG. 4 is a cross-sectional view of an essential part showing another embodiment of the image display device of the present invention.

FIG. 4 is a constitutional view showing another embodiment of the image display device according to the present invention and corresponds to FIG. 3B.

The constitution which makes this embodiment different from the embodiment shown in FIG. 3B lies in that widths of respective power supply lines SL, SLs, SLs1 are set to large values corresponding to lengths thereof.

That is, as viewed in plan, the power supply line SLs1 corresponding to the width W2 is the shortest and hence, by establishing the relationship that the width W1 of the power supply line SL, the width W3 of the power supply line SLs >the width W2 of the power supply line SLs1, power supply resistances of respective power supply lines SL, SLs, SLs1 are made more uniform.

Further, setting of widths of respective power supply lines SL, SLs, SLs1 is not limited to the above and may be performed in order of length. That is, when the power supply line SL corresponding to the width W1 is the longest, the relationship that the width W1 of the power supply line SL>the width W3 of the power supply line SLs>the width W2 of the power supply line SLs1 may be established.

Embodiment 5.

Figure 5A:
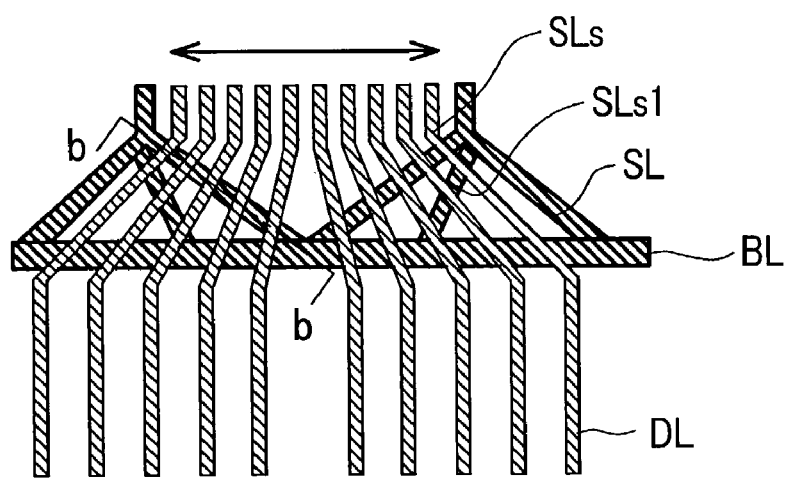
FIG. 5 is a cross-sectional view of an essential part showing another embodiment of the image display device of the present invention.
Figure 5B:
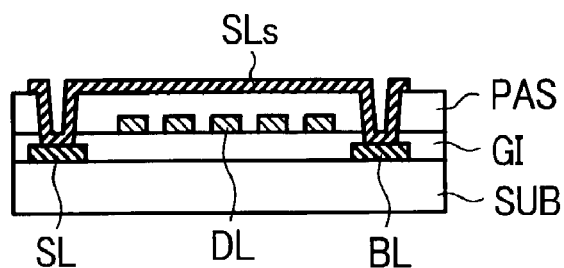

FIG. 5A is a plan view showing another embodiment of the image display device according to the present invention and corresponds to FIG. 3A. Further, FIG. 5B is a cross-sectional view taken along a line b—b in FIG. 5A.

The constitution which makes this embodiment different from the constitution shown in FIG. 3A lies in that the protective film PAS is formed above the drain signal lines DL and power supply lines SLs are formed above the protective film PAS. Further, the bus line BL, the power supply lines SL and the power supply lines SLs1 are respectively formed between the transparent substrate SUB1 and the insulation film GI.

The power supply lines SLs which are formed on the protective film PAS have both ends thereof respectively connected to the power supply lines SL and the bus line BL respectively via through holes formed in the protective film PAS and the insulation film GI in a penetrating manner.

In this case, by forming the protective film PAS using an organic material layer or a laminated body consisting of an inorganic material layer and an organic material layer, a crossing capacitance between the drain signal line DL and the power supply line SLs can be reduced.

Further, by using a light transmissive conductive material such as ITO (Indium Tin Oxide), ITZO (Indium Tin Zinc Oxide), IZO (Indium Zinc Oxide), $SNO_2$ (Tin Oxide), $IN_2O_3$ (Indium Oxide) or the like as a material of the power supply line SLs, for example, respective drain signal lines DL can be observed with naked eyes so that it is possible to obtain an advantageous effect that the maintenance can be easily performed when a short circuiting between them occurs.

Embodiment 6.

Figure 6A:
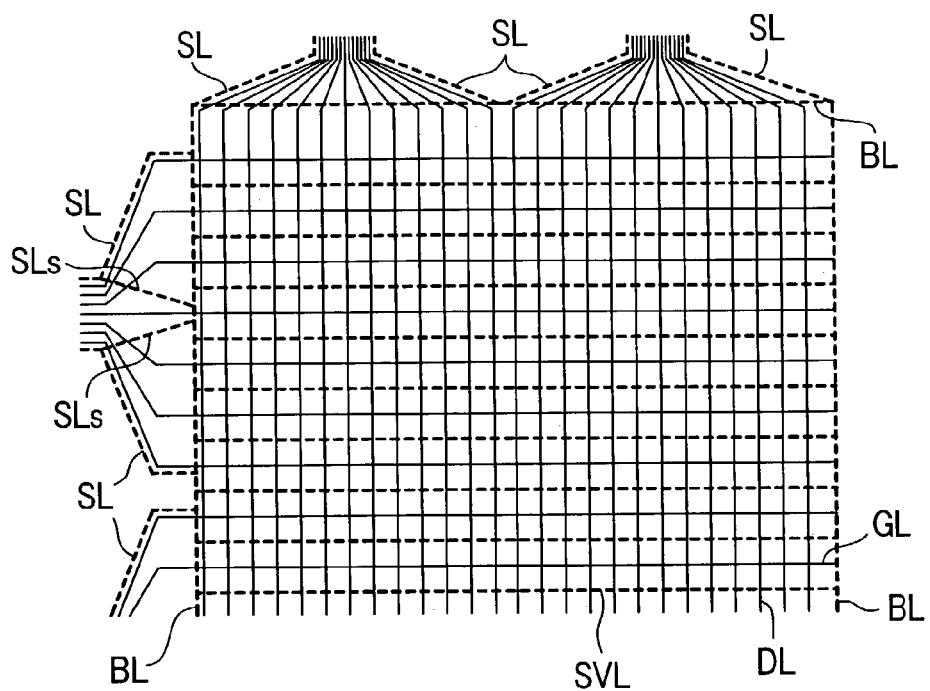
FIG. 6 is a cross-sectional view of an essential part showing another embodiment of the image display device of the present invention.
Figure 6B:
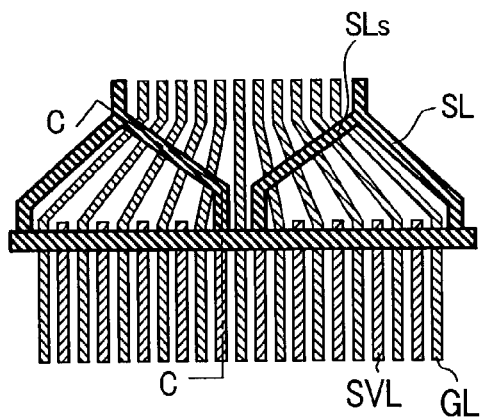
Figure 6C:
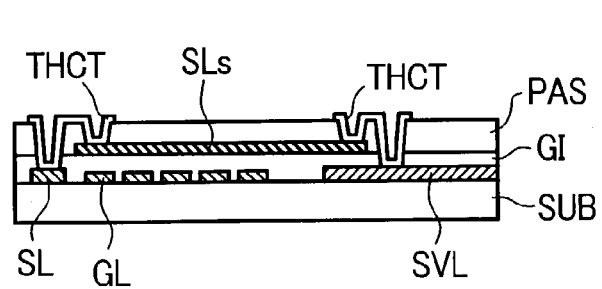

FIG. 6 is a constitutional view showing another embodiment of the image display device according to the present invention, wherein FIG. 6A is a plan view, FIG. 6B is an enlarged view of a periphery of a semiconductor integrated circuit of a scanning signal drive circuit, and FIG. 6C is a cross-sectional view taken along a line c—c in FIG. 6B.

This embodiment is characterized in that the above-mentioned respective embodiments are applied to the periphery of the semiconductor integrated circuit of the scanning signal drive circuit. That is, the periphery of the semiconductor integrated circuit is also provided with the power supply lines SLs besides the power supply lines SL.

In this case, since gate signal lines GL are formed between a transparent substrate SUB1 and an insulation film GI, the power supply lines SL and a reference potential signal line SVL can be also formed on the same layer as the gate signal lines GL and the power supply lines SLs are formed on an upper surface of the gate insulation film GI.

Then, the connection of the power supply lines SLs with the power supply lines SL and the bus line BL is performed using connection electrodes THCT which are formed at through hole portions formed from a surface of the protective film PAS.

Embodiment 7.

Figure 7:
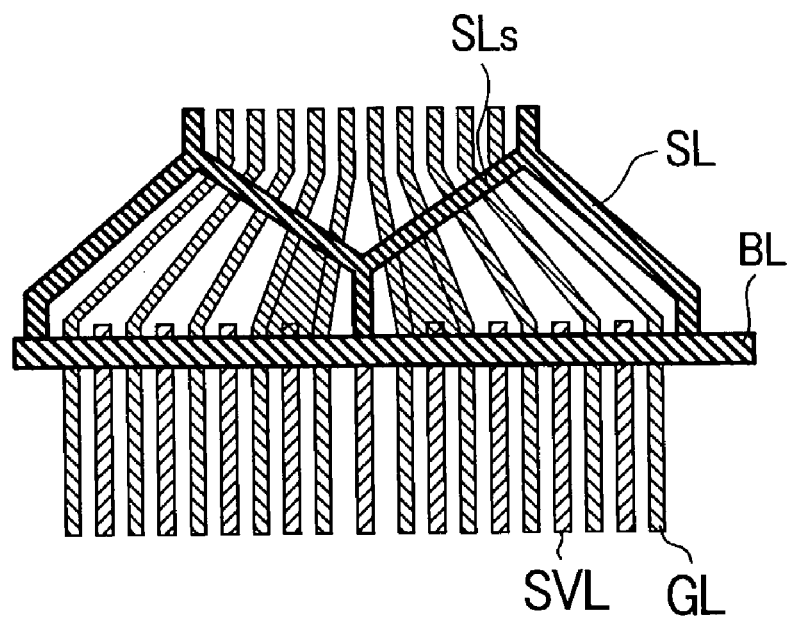
FIG. 7 is a plan view of an essential part showing another embodiment of the image display device of the present invention.

FIG. 7 is a plan view showing another embodiment of the image display device according to the present invention and corresponds to FIG. 6B.

The constitution which makes this embodiment different from the embodiment shown in FIG. 6B lies in that the number of the gate signal lines GL which are formed into each group is set to an even number such as 128, 258, 300, 384, 480.

Due to such a constitution, respective power supply lines SLs which extend from both sides of a semiconductor integrated circuit are converged to a region between gate signal lines GL and hence, it is possible to attain a balance of parasitic capacitance between respective power supply lines SLs and respective gate signal lines GL which are overlapped to the power supply lines SLs whereby the brightness irregularities of the display can be prevented.

Embodiment 8.

Figure 8:
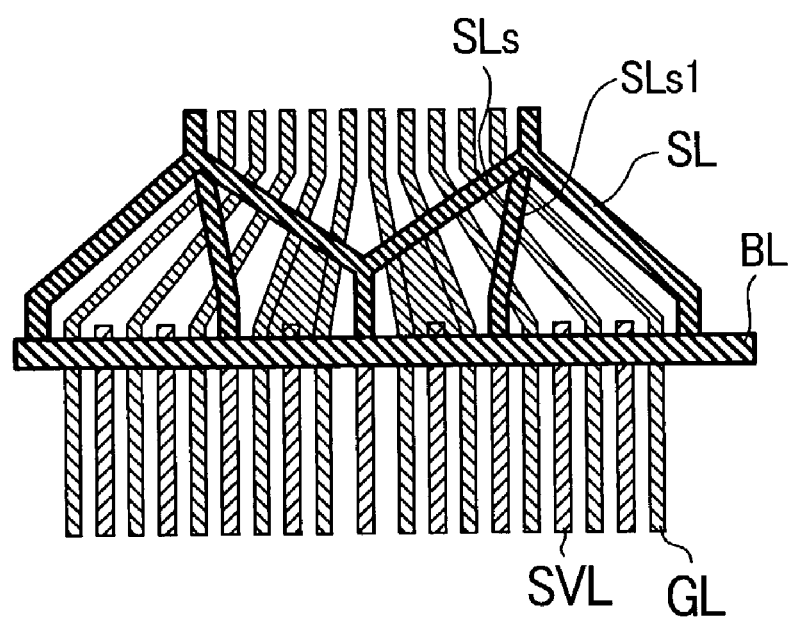
FIG. 8 is a plan view of an essential part showing another embodiment of the image display device of the present invention.

FIG. 8 is a plan view showing another embodiment of the image display device according to the present invention and corresponds to FIG. 7.

The constitution which makes this embodiment different from the embodiment shown in FIG. 7 lies in that another power supply lines SLs1 are also formed in addition to the power supply lines SLs.

Embodiment 9.

Figure 9:
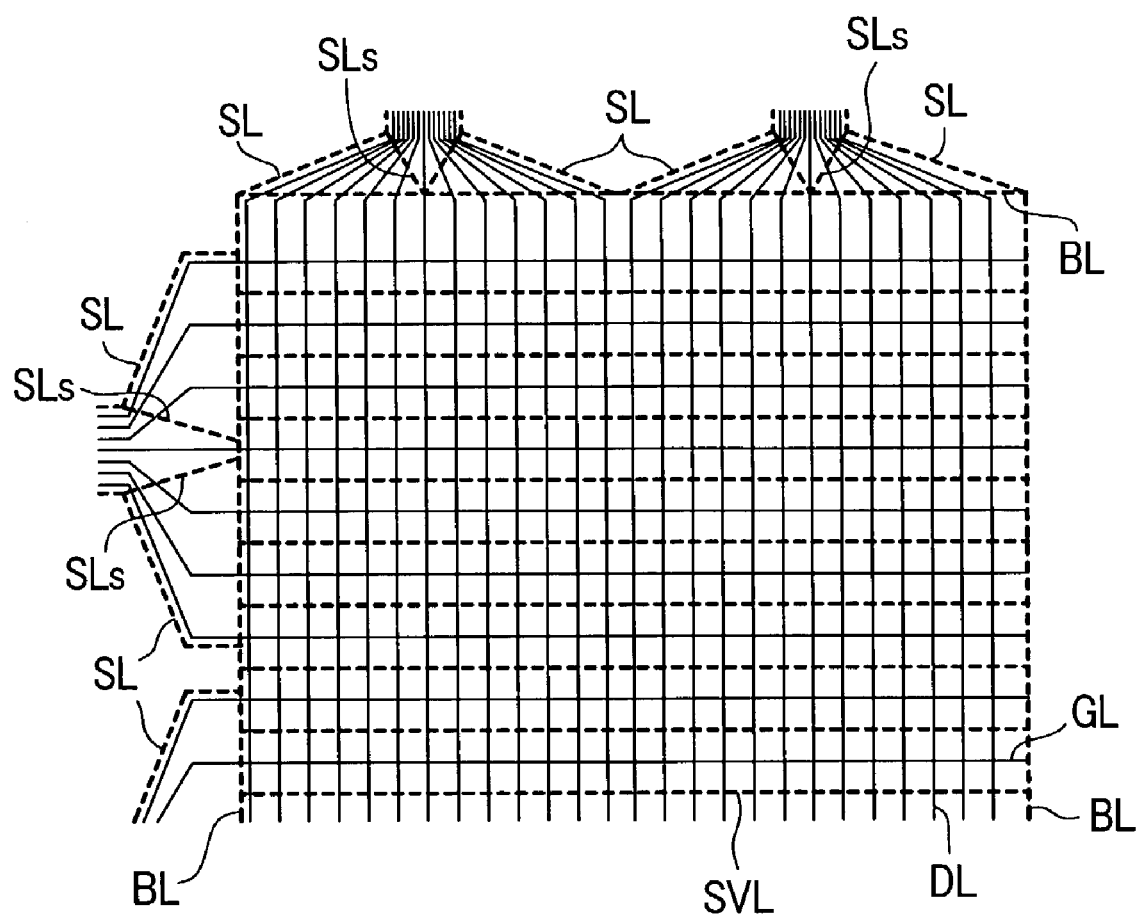
FIG. 9 is a plan view showing another embodiment of the image display device of the present invention.

FIG. 9 is a plan view showing another embodiment of the image display device according to the present invention and corresponds to FIG. 6.

The constitution which makes this embodiment different from the embodiment shown in FIG. 6 lies in that power supply lines SLs are newly provided to a periphery of a semiconductor integrated circuit of a video signal drive circuit and a periphery of a semiconductor integrated circuit of a scanning signal drive circuit.

Due to such a constitution, it is possible to obtain an advantageous effect that the reference signals can be supplied uniformly to respective reference potential lines SVL.

Embodiment 10.

In the above-mentioned respective embodiments, the explanation has been made with respect to a so-called lateral electric field type liquid crystal display device in which counter electrodes CT are formed as the layer above the protective film PAS. However, it is needless to say that the present invention is not limited to the lateral electric field type liquid crystal display device and is, as shown in FIG. 18, for example, applicable to a liquid crystal display device in which counter electrodes CT are formed on the same layer as gate signal lines GL, for example.

This is because that these liquid crystal display devices differ only in the constitution of pixels and they have substantially the same constitution at peripheries of the video signal drive circuit He and the scanning signal drive circuit V.

Figure 18:
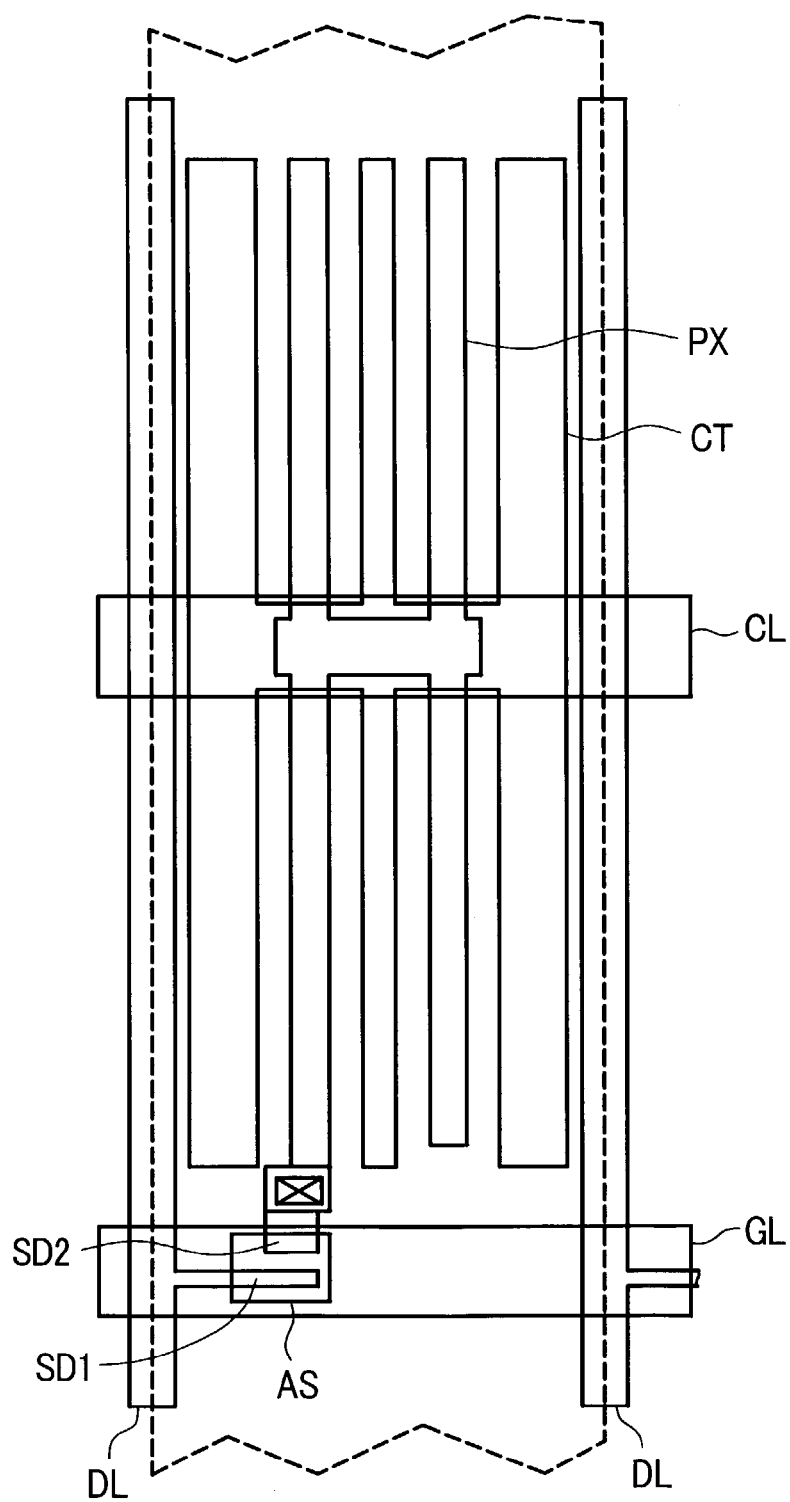
FIG. 18 is a plan view showing one embodiment of a pixel of the image display device of the present invention.

Here, in the constitution of the pixel of the liquid crystal display device shown in FIG. 18, the counter electrodes CT which are formed on the same layer as the gate signal line GL as mentioned above are electrically connected with the counter voltage signal line CL which is formed such that the counter voltage signal line CL extends to other pixels arranged at left and right sides of the pixel in the drawing, and the counter voltage signal line CL functions as the above-mentioned reference potential line SVL.

Here, in this drawing, the pixel electrode PX is formed on a layer different from the counter electrode CT by way of the insulation film and respective electrodes are arranged from one drain signal line DL to another drain signal line DL in order of the counter electrode CT, the pixel electrode PX, the counter electrode CT, the pixel electrode PX and the counter electrode CT.

Further, in a liquid crystal display device which is provided with capacitive signal lines which are formed in the substantially same manner as the counter voltage signal line CL in pixels, the capacitive signal lines can be applicable as the above-mentioned reference potential lines.

These capacitive signal lines constitute capacitive elements with the pixel electrodes PX in each pixel and hence, it is necessary to supply voltage signals which constitute the reference with respect to the video signals to the capacitive signal lines.

Further, due to the same reason, it is needless to say that the present invention is not limited to the liquid crystal display devices and is applicable to other image display device such as organic EL (Electro Luminescence) elements or the like, for example.

Embodiment 11.

Figure 10A:
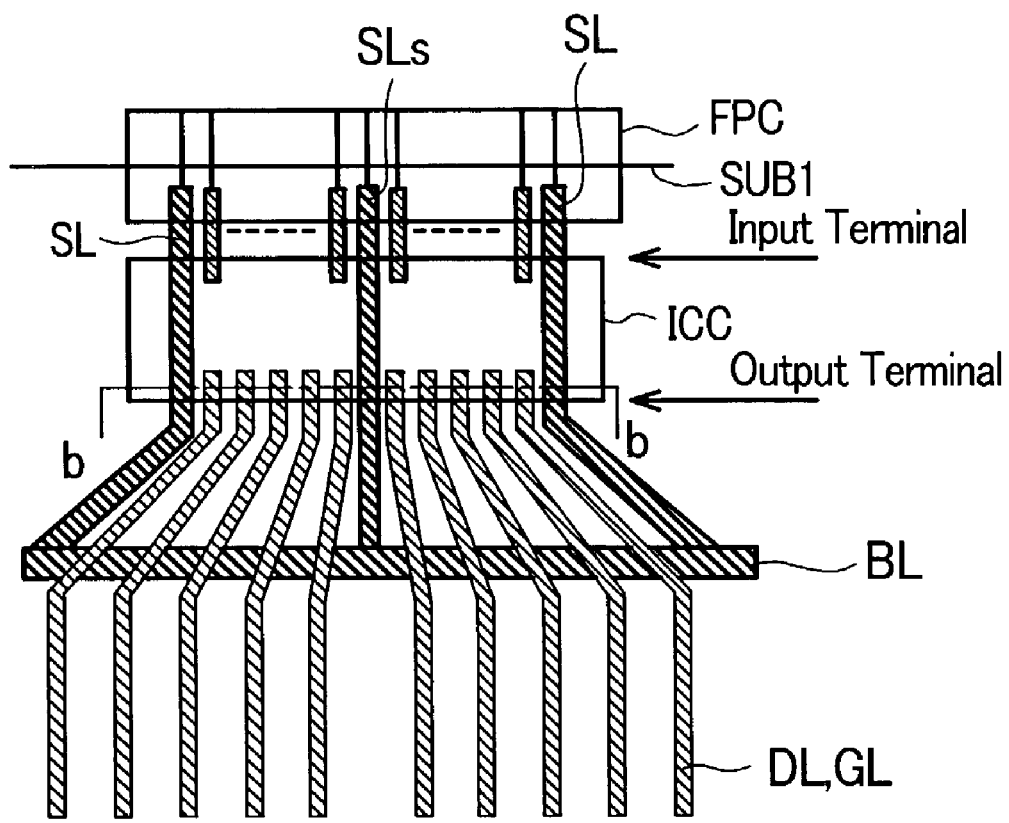
FIG. 10 is a constitutional view of an essential part showing another embodiment of the image display device of the present invention.
Figure 10B:
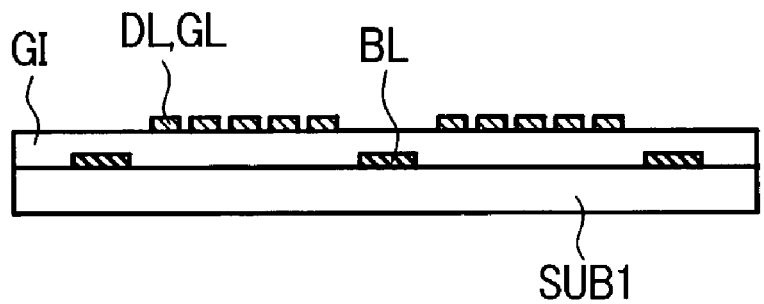

FIG. 10A is a plan view showing another embodiment of the image display device according to the present invention and FIG. 10B is a cross-sectional view taken along a line b—b in FIG. 10A.

In the above-mentioned respective embodiments, all of power supply lines SL, SLs which supply electricity to the bus line BL are taken out from both sides of the semiconductor integrated circuit. However, as shown in FIG. 10, it is needless to say that the power supply lines SL, SLs run below the semiconductor integrated circuit.

That is, for example, there is provided a flexible printed circuit board FPC which is arranged on a periphery of a transparent substrate SUB1 and has terminals thereof connected to terminals of the transparent substrate SUB1, and the power supply lines SL, SLs which are supplied electricity from the printed circuit board FPC side are formed on a surface of the transparent substrate SUB1.

These power supply lines SL, SLs are formed such that they run below the semiconductor integrated circuit ICC while crossing the semiconductor integrated circuit ICC. The semiconductor integrated circuit ICC is mounted on the transparent substrate SUB1 using a so-called face down bonding.

Then, the power supply lines SL, SLs are integrally formed with the bus line BL which is formed on the same layer as the power supply lines SL, SLs.

Further, the power supply lines SL, SLs and the bus line BL are formed as a layer below the insulation film GI and drain signal lines DL are, for example, formed as a layer above the insulation film GI.

Due to such a constitution, it is also possible to supply the reference signals at a relatively narrow interval to the bus line BL and hence, it is possible to supply electricity to respective reference potential lines SVL without irregularities.

Embodiment 12.

Figure 11:
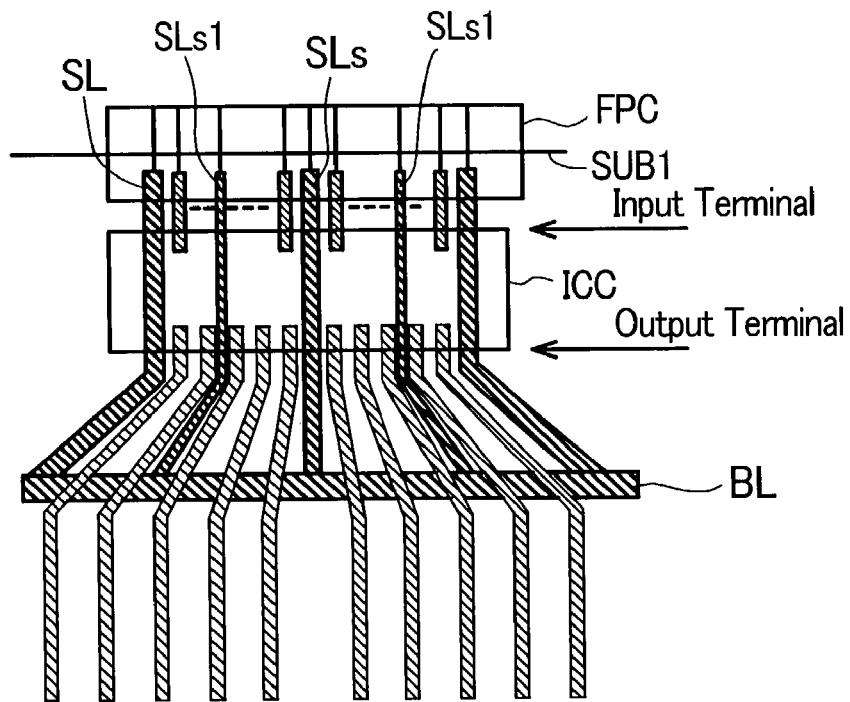
FIG. 11 is a plan view of an essential part showing another embodiment of the image display device of the present invention.

FIG. 11 is a plan view showing another embodiment of the image display device according to the present invention and corresponds to FIG. 10A.

The constitution which makes this embodiment different from the embodiment shown in FIG. 10A lies in that a new power supply line SLs1 is provided between the power supply line SLs and the power supply line SL.

Embodiment 13.

Figure 12:
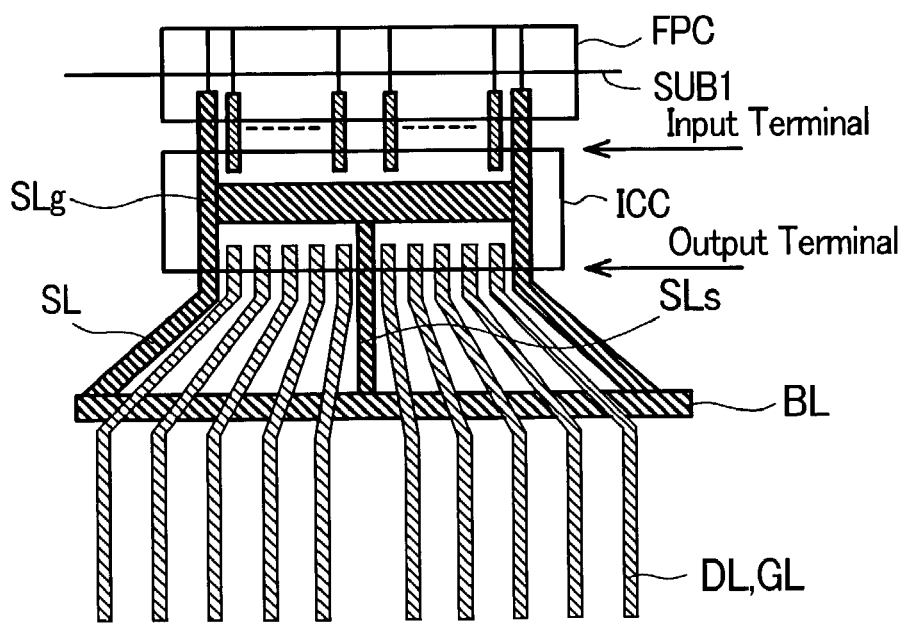
FIG. 12 is a plan view of an essential part showing another embodiment of the image display device of the present invention.

FIG. 12 is a plan view showing another embodiment of the image display device according to the present invention and corresponds to FIG. 10.

The constitution which makes this embodiment different from the embodiment shown in FIG. 10 lies in that one end of the power supply line SLs which is connected to the bus line BL is connected to a wiring layer SLg having a relatively wide width which is arranged below a semiconductor integrated circuit ICC and connects a pair of power supply lines SL.

Due to such a constitution, it is possible to reduce the wiring layer for supplying electricity to the power supply line SLs at the printed circuit board FPC side.

Embodiment 14.

Figure 13A:
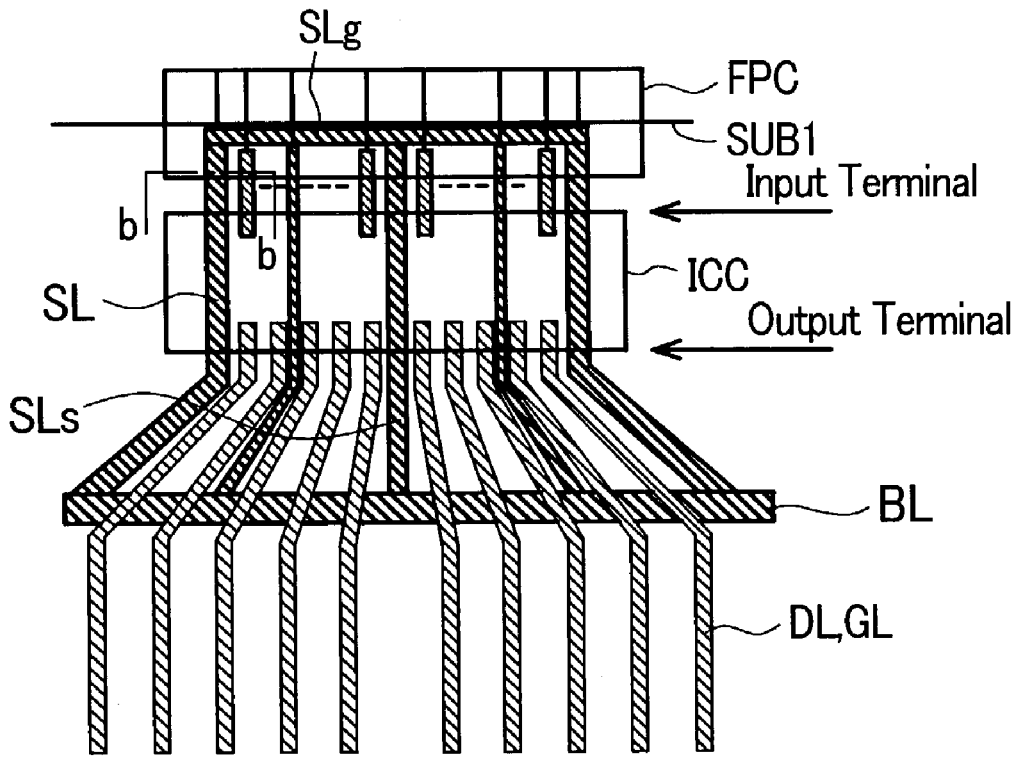
FIG. 13 is a constitutional view of an essential part showing another embodiment of the image display device of the present invention.
Figure 13B:
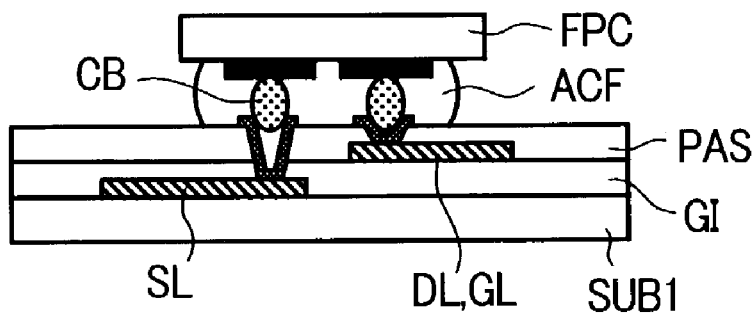

FIG. 13A is a plan view showing another embodiment of the image display device according to the present invention and corresponds to FIG. 12. Further, FIG. 13B is a cross-sectional view taken along a line b—b in FIG. 13A.

The constitution which makes this embodiment different from the embodiment shown in FIG. 12 lies in that the wiring layer SLg shown in FIG. 12 is not formed below the semiconductor integrated circuit ICC but is formed below the printed circuit board FPC.

Due to such a constitution, it is unnecessary to increase the number of terminals of the printed circuit board FPC. Further, since the input and output terminals of the semiconductor integrated circuit ICC are configured to be surrounded by the annular reference voltage, it is possible to obviate the breakdown of the semiconductor integrated circuit ICC attributed to static electricity.

In this embodiment, the drain signal lines DL or the gate signal lines GL which are formed at the transparent substrate SUB1 side and the power supply lines SL are formed on different layers, while respective electrodes which are pulled out to a surface of the protective film PAS are connected to the terminals on a surface of the printed circuit board FPC through an anisotropic conductive film ACF interposed between the protective film PAS and the printed circuit board FPC.

Here, the anisotropic conductive film ACF is formed of a resin film in which a large number of conductive beads are scattered and mixed.

Embodiment 15.

Figure 14:
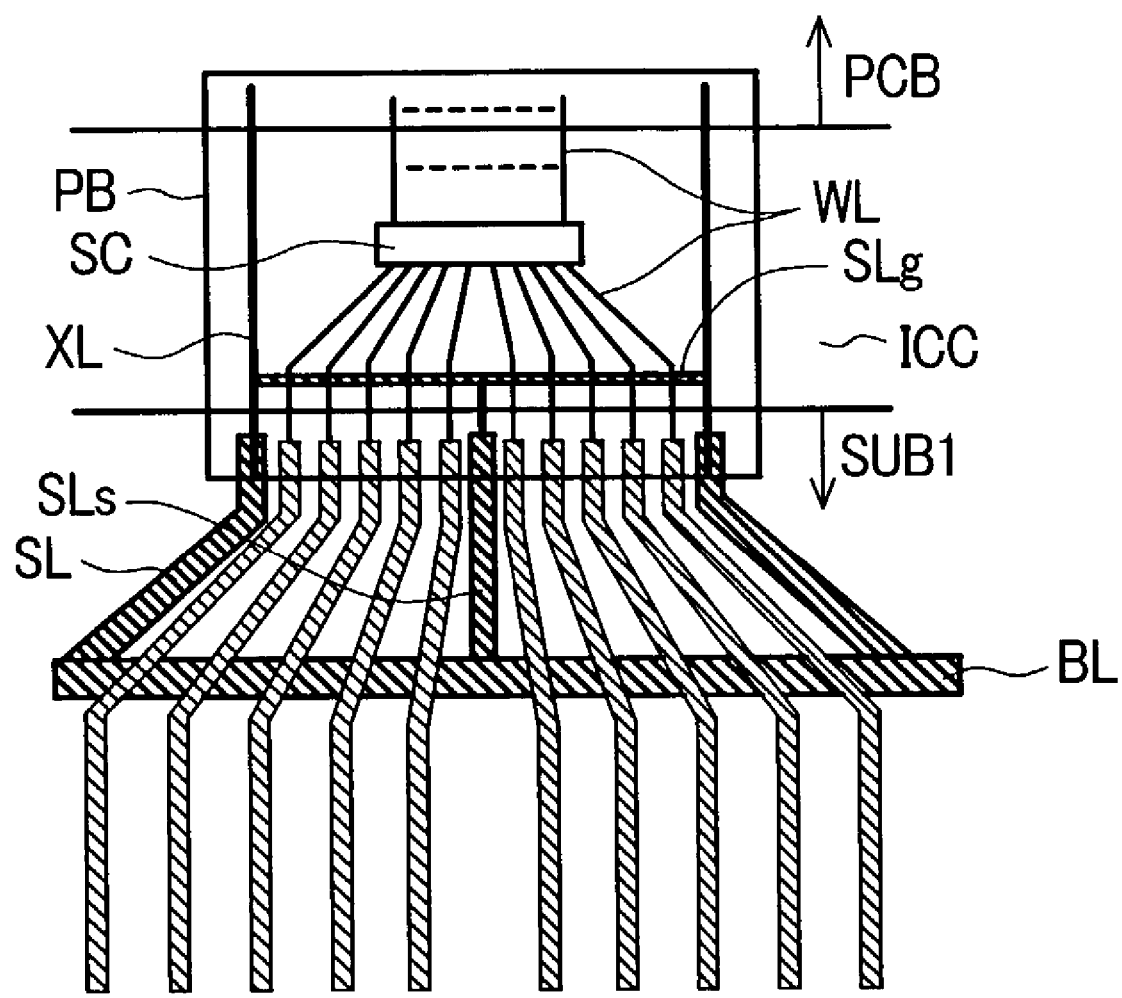
FIG. 14 is a plan view of an essential part showing another embodiment of the image display device of the present invention.

FIG. 14 is a plan view showing another embodiment of the image display device according to the present invention. In this embodiment, the semiconductor integrated circuit ICC of the video signal drive circuit is constituted of a so-called tape carrier system, for example.

That is, on a surface of a flexible resin substrate PB on which a semiconductor chip SC is mounted by bonding, a wiring layer WL for pulling out bumps of the semiconductor chip SC is formed. The wiring layer WL is configured to have terminals at one side portion of the resin substrate PB and at another side portion which faces one side portion in an opposed manner.

Such a semiconductor integrated circuit ICC is arranged astride the transparent substrate SUB1 and the printed circuit board PCB which is arranged slightly spaced apart from the transparent substrate SUB1, wherein respective terminals of one side portion are connected to respective terminals at the transparent substrate SUB1 side and respective terminals of another side portion are connected to respective terminals at the printed circuit board PCB side.

Then, with respect to the semiconductor integrated circuit ICC, on a surface of the resin substrate PB which is opposite to the surface on which the wiring layer WL is formed, another wiring layer XL which is connected to the power supply lines SL, SLs which are formed at the transparent substrate SUB1 side is formed.

That is, another wiring layers XL which are connected to the power supply lines SL, SLs are formed based on a free layout without being restricted by the signal lines WL which are to be originally formed on the resin substrate PB.

In this case, the wiring layers XL to which the power supply lines SL are respectively connected are connected to each other by the wiring layer SLg.

Embodiment 16

Figure 15A:
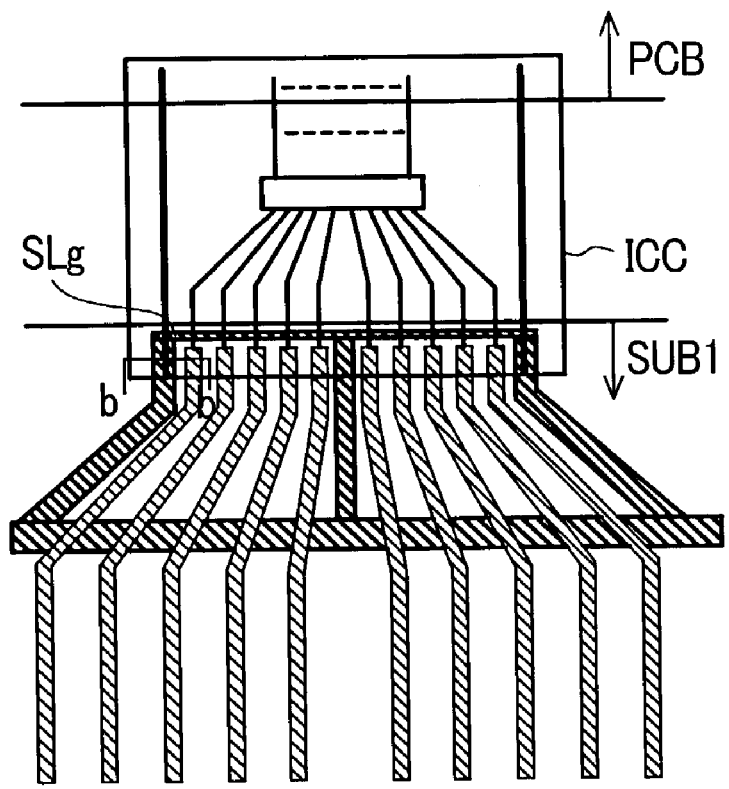
FIG. 15 is a constitutional view of an essential part showing another embodiment of the image display device of the present invention.
Figure 15B:
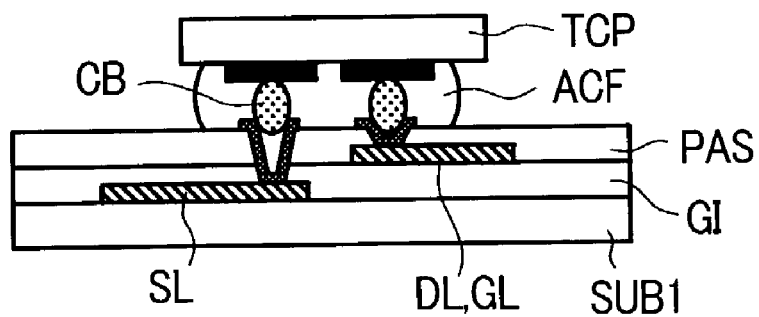

FIG. 15A is a plan view showing another embodiment of the image display device according to the present invention and corresponds to FIG. 14. Further, FIG. 15B is a cross-sectional view taken along a line b—b in FIG. 15A.

The constitution which makes this embodiment different from the embodiment shown in FIG. 14 lies in that the wiring layers XL to which the respective power supply lines SL are connected are formed at the transparent substrate SUB1 side.

Embodiment 17

It is needless to say that although the above-mentioned respective embodiments are applicable to various image display devices, the embodiments are not limited to these liquid crystal display devices and are applicable to other image display devices.

As can be clearly understood from the foregoing explanation, according to the image display device of the present invention, it is possible to obtain the images with no brightness irregularities of display.

The invention claimed is:
1. An image display device comprising:
a plurality of drain signal lines formed in parallel on a pixel-forming-side surface of a substrate, said plurality of drain signal lines being arranged close to each other and are formed into groups, and first ends of the respective group of drain signal lines converging together and connecting to an output terminal of a semiconductor integrated circuit which constitutes a video signal drive circuit;

a bus line for supplying reference signals to respective pixels is formed at least on an outer profile of a mass of the pixels;

first power supply lines formed to extend from both sides of said semiconductor integrated circuit to said bus line along the outside of said respective group of drain signal lines in a plan view; and second power supply lines formed to extend from said both sides of said semiconductor integrated circuit to said the bus line at an approximate center portion of said respective group of drain signal lines in the plan view.

2. An image display device according to claim 1, wherein said image display device further includes third power supply lines, and said third power supply lines are formed to extend from said both sides of said semiconductor integrated circuit to the bus line at a position between a connection portion of said first power supply lines with the bus line and a connection portion of said second power supply lines with the bus line.

3. An image display device according to claim 1, wherein said second power supply lines are formed of a layer different from a layer said drain signal lines formed from with an insulation film in-between.

4. An image display device according to claim 1, wherein the number of said drain signal lines which are formed into said respective group is an even number.

5. An image display device comprising:

a plurality of gate signal lines formed in parallel on a pixel-forming-side surface of a substrate, said plurality of gate signal lines being arranged close to each other and formed into groups, and first ends of the respective group of gate signal lines converging together and connecting to an output terminal of a semiconductor integrated circuit which constitutes a scanning signal drive circuit;

a bus line for supplying reference signals to respective pixels formed on at least an outer profile of a mass of the pixels;

first power supply lines formed to extend from both sides of said semiconductor integrated circuit to said bus line along the outside of said respective group of gate signal lines in a plan view; and second power supply lines are formed to extend from both sides of said semiconductor integrated circuit to the bus line at an approximate center portion of said respective group of date signal lines in the plan view.

6. An image display device according to claim 5, wherein said image display device further includes third power supply lines, and said third power supply lines are formed to extend from both sides of said semiconductor integrated circuit to the bus line at a position between connection portions of said first power supply line with the bus line and connection portions of said, second power supply line with the bus line.

7. An image display device according to claim 6, wherein said second power supply lines are formed of a layer different from a layer said gate signal lines formed from with an insulation film in-between.

8. An image display device according to claim 6, wherein the number of said gate signal lines which are formed into said respective group is an even number.

9. An image display device according to claim 5, wherein said second power supply lines are formed of a layer different from a layer said gate signal lines formed from with an insulation film in-between.

10. An image display device according to claim 5, wherein the number of said gate signal lines which are formed into said respective group is an even number.

11. An image display device comprising:

a plurality of signal lines formed in parallel on a pixel-forming-side surface of a substrate, said plurality of signal lines being arranged close to each other and formed into groups, and first ends of the respective group of signal lines converging together and connecting to an output terminal of a semiconductor integrated circuit which constitutes a signal drive circuit and is mounted on the substrate; and a bus line for supplying reference signals to respective pixels formed on at least an outer profile of a mass of the pixels, said reference signals are supplied to the bus line through a power supply line formed on a mounting region of said semiconductor integrated circuit.

12. An image display device according to claim 11, wherein said power supply line is constituted of a plurality of power supply lines.

13. An image display device comprising:

a plurality of signal lines formed in parallel on a pixel-forming-side surface of a substrate, a plurality of signal lines being arranged close to each other and formed into groups, and first ends of the respective group of signal lines converging together and connecting to an output terminal of a semiconductor integrated circuit which constitutes a signal drive circuit, said semiconductor integrated circuit configured to include a resin substrate, a semiconductor chip mounted on said resin substrate, and a wiring layer for pulling out terminals of said semiconductor chip to a surface of said resin substrate, a bus line for supplying reference signals to respective pixels formed on at least an outer profile of a mass of the pixels, wherein said reference signals are supplied to the bus line through power supply lines formed on a surface of said resin substrate of said semiconductor integrated circuit.

14. An image display device according to claim 13, wherein said power supply lines are formed on the surface of said resin substrate of said semiconductor integrated circuit opposite to the surface on which said wiring layer is formed.

* * * * *